Sept. 5, 1933.     R. W. WHITTLE     1,925,683
HOUSING FOR FLUID PRESSURE REGULATING VALVES
Filed June 15, 1931     4 Sheets-Sheet 1

Reginald W. Whittle
INVENTOR
BY O. V. Thiele
ATTORNEY

Sept. 5, 1933.    R. W. WHITTLE    1,925,683
HOUSING FOR FLUID PRESSURE REGULATING VALVES
Filed June 15, 1931    4 Sheets-Sheet 2

Reginald W. Whittle
INVENTOR

BY O. V. Thiele
ATTORNEY

Sept. 5, 1933.  R. W. WHITTLE  1,925,683
HOUSING FOR FLUID PRESSURE REGULATING VALVES
Filed June 15, 1931  4 Sheets-Sheet 3
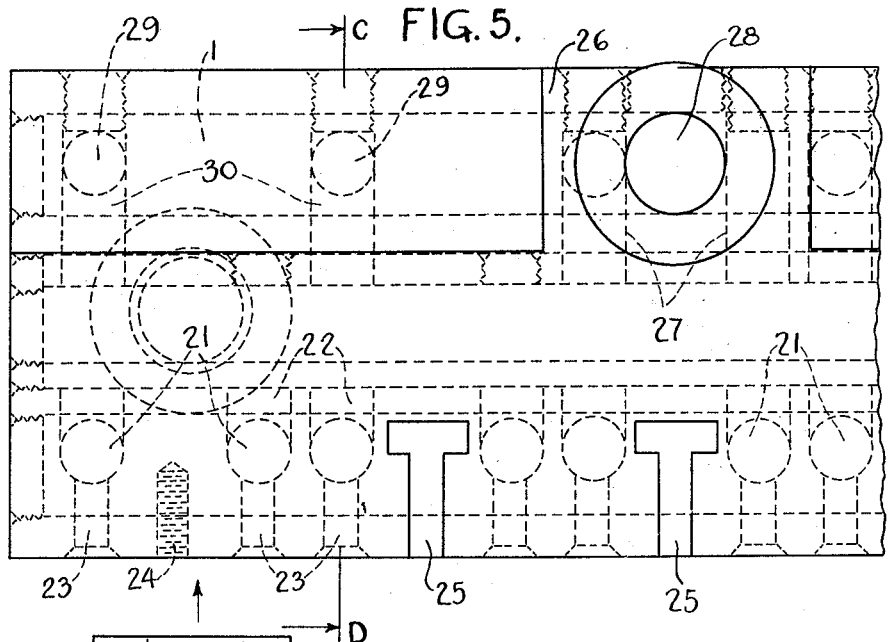
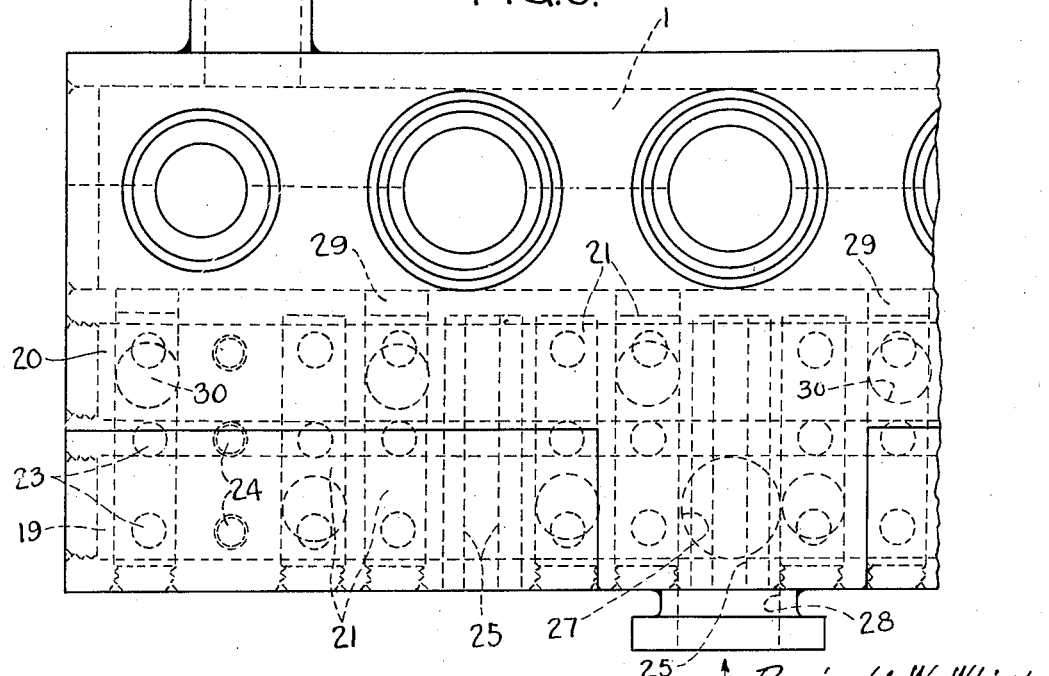
Reginald W. Whittle
INVENTOR
BY O. I. Thiele
ATTORNEY

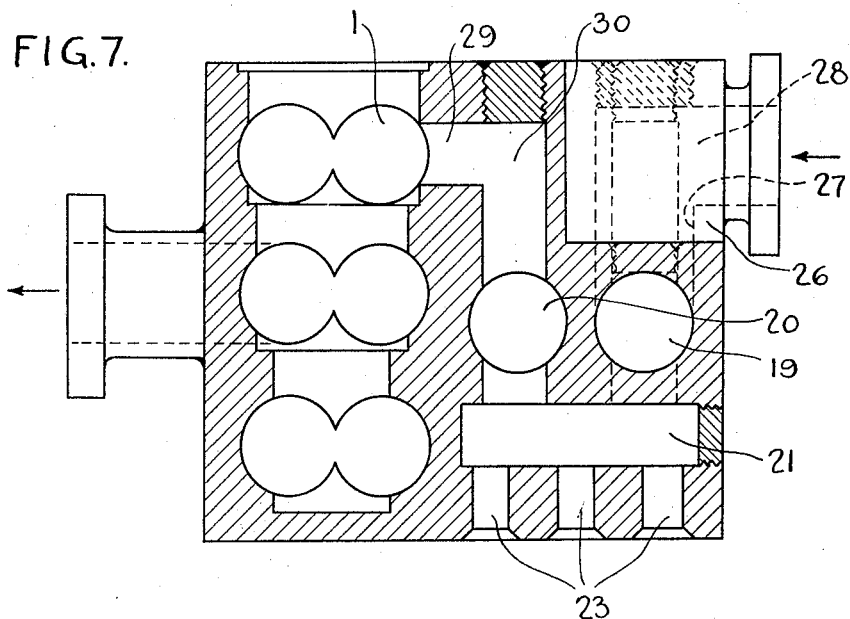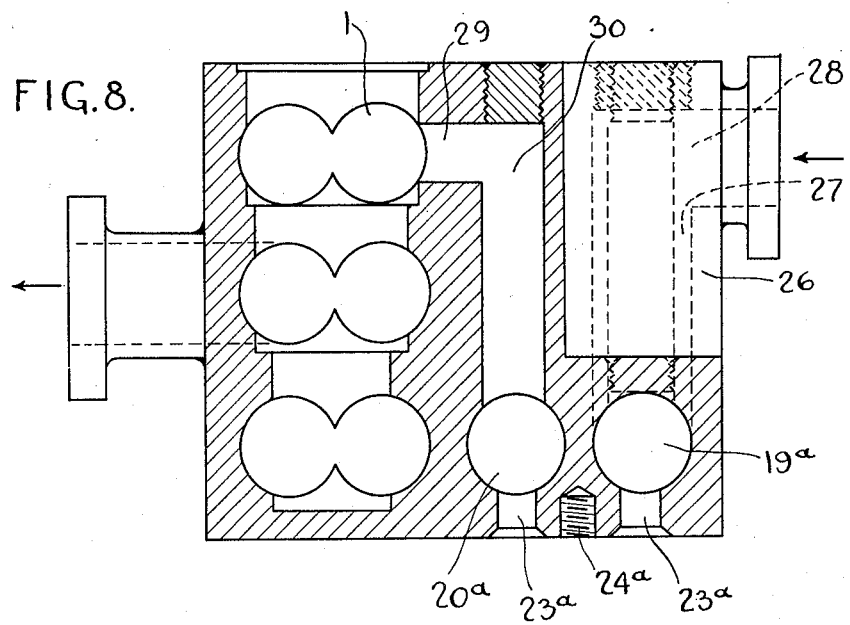

Patented Sept. 5, 1933

1,925,683

UNITED STATES PATENT OFFICE 1,925,683

HOUSING FOR FLUID PRESSURE REGULATING VALVES

Reginald W. Whittle, Urmston, England, assignor to The Superheater Company, New York, N. Y.

Application June 15, 1931, Serial No. 544,518, and in Great Britain June 20, 1930

2 Claims. (Cl. 122—462)

This invention relates to valve housings of the kind in which there is arranged a plurality of relatively small valves provided for regulating the flow of steam or other fluid under pressure to a reciprocating engine, turbine or other steam using apparatus or plant. A valve apparatus of this character may be termed a multiple valve regulating apparatus and the valves thereof may have balancing pistons to which fluid pressure is admitted to minimize the effort required to open the valves. Also the valves can be, and preferably are, arranged to be opened in some predetermined order with a view to obtaining the desired control of the steam or other fluid under pressure.

The invention further relates to a combined valve housing of the kind above indicated and a steam superheater header.

Heretofore in multiple valve regulating apparatus of the kind above indicated and also combined superheater headers and valve housings of the kind mentioned, the housing or combined header and housing has been a casting, usually an iron casting, and the regulator valve housing has comprised a plurality of chambers, one constituting a supply chamber and another a delivery chamber, the connection between which is controlled by the valves. The housings as now usually employed also have comprised a balancing chamber, in which case the rock shaft employed for actuating the valves has been arranged in the balancing chamber, a pilot valve being provided adapted to supply steam from the supply chamber to the balancing chamber to act upon the balancing pistons connected to the valves to substantially counterbalance the steam pressure acting on them and tending to hold them closed.

Where steam superheater headers have been combined with the valve housings they usually have comprised longitudinal channels for saturated and superheated steam respectively with transverse chambers or pockets formed in one therewith, to which the superheating tubes or elements are connected, the superheated steam chamber or channel of the header being in open communication with the supply chamber in the valve housing.

There is a limit to the pressure and temperature with which cast metal valve housings or combined valve housings and superheater headers can be safely used, and the object of the present invention is to construct a valve housing or a combined valve housing and superheater header from wrought iron or steel, which shall be capable of being mounted in a comparatively small space and be of relatively small weight, and which will withstand the high or comparatively high temperatures now contemplated, such for example as 1,500 or 2,000 lbs. per square inch at 700° to 850° Fahrenheit.

The present invention consists principally in a wrought metal housing for the valves of regulator valve apparatus of the kind indicated, produced by boring or machining a solid wrought iron or steel billet or forging to form therein superposed fluid pressure supply and delivery chambers separated by a partition having a plurality of valve seat apertures formed in it by boring or equivalent operations.

A wrought metal housing according to the invention may have in addition to the supply and delivery chambers a balancing chamber below, and separated by a partition from, the delivery chamber, a passage providing a direct communication between the supply chamber and the balancing chamber, and bores in the partition between the delivery and balancing chambers to accommodate balancing pistons on the valves, the said balancing chamber, passage and bores being formed in the billet or forging by boring or machining.

Further according to the invention the wrought metal housing may be formed integrally with a superheater header the saturated and superheated steam chambers of which also are produced by boring or machining in a solid billet or forging.

The open ends of the borings are closed where necessary by discs welded or screwed and welded into the said ends.

The invention further consists in the features of construction pointed out in the appended claims and described hereinafter with reference to the accompanying drawings, in which:—

Figs. 5 and 6 are respectively a rear elevation and a plan of a portion of a combined valve housing and superheater header according to an embodiment of the invention.

Fig. 7 is a cross section of the valve housing and superheater header shown in Fig. 6, the section being taken on the line C—D of Fig. 5.

Fig. 8 is a similar view to Fig. 7 to illustrate another embodiment of the invention.

Figure 1:
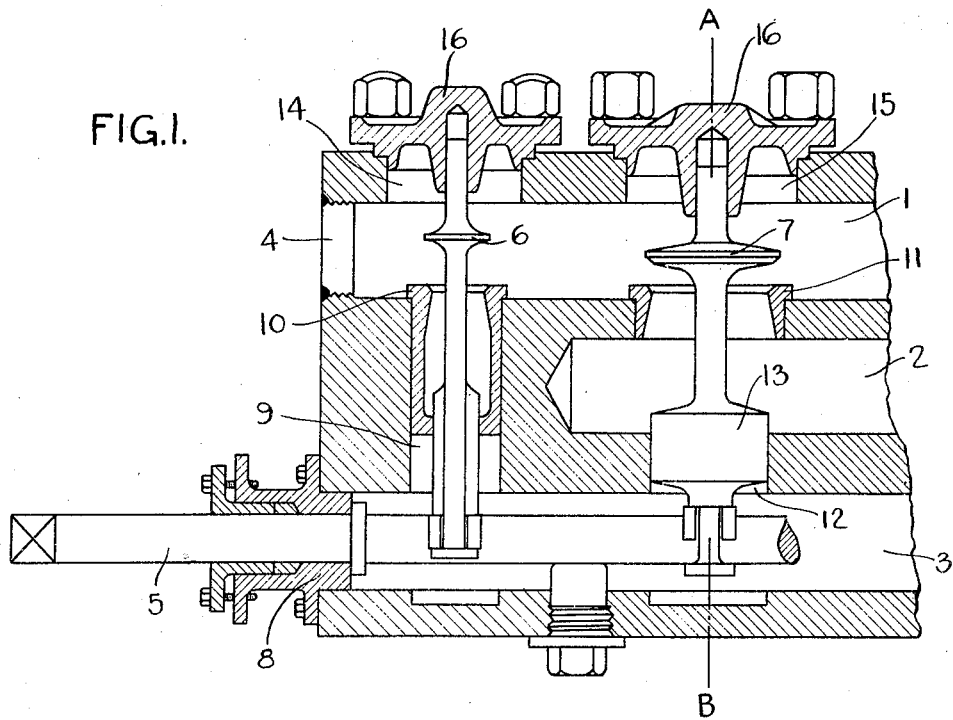
Fig. 1 is a sectional elevation of a portion of a valve housing for multiple valve regulating apparatus of a new generally known type, the housing being made according to one embodiment of the invention.
Figure 2:
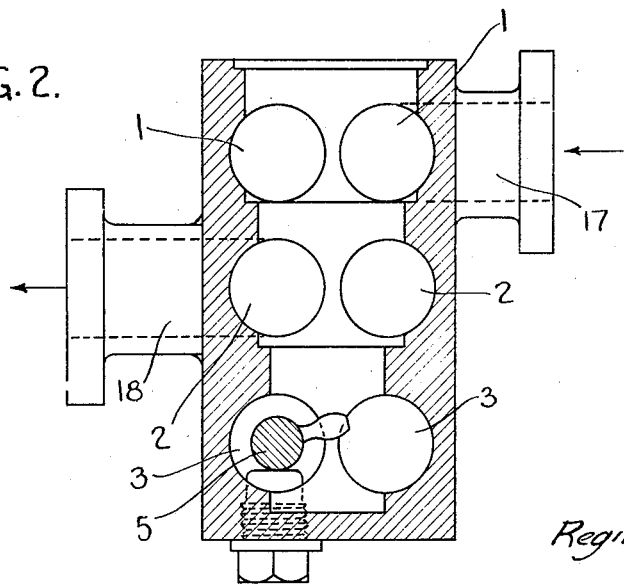
Fig. 2 is a cross section of the valve housing illustrated in Fig. 1, the section being taken on the line A—B of that figure and the valve shown in Fig. 1 being omitted.

Referring first to Figs. 1 and 2, the valve housing therein illustrated is formed from a solid billet by boring. The housing comprises a steam supply chamber 1, a steam delivery chamber 2 and a balancing chamber 3. Each of these chambers is formed of two borings, extending longitudinally of the billet. The borings for the chambers 1 and 3 may extend completely through the billet, but the borings for the chamber 2 terminate short of one end of the header as seen in Fig. 1. The ends of the borings which form the chamber 1 are closed by discs 4 welded or as shown screwed and welded into the open ends of the bores, the ends of the borings for the chamber 3 may be closed by the bushes providing bearings for the rock shaft 5 which operates the valves 6, 7. The bush at one end of the chamber 3 may have a blind bore forming the bearing for the end of the shaft 5 and that at the other end marked 8 in Fig. 1 may include an appropriate packing gland. To provide the passage affording communication between the supply chamber 1 and the delivery chamber 3 the billet is bored vertically through the solid metal between the end of the billet and the end of the chamber 2. This bore 9 would be equipped with a valve seat member 10, the lower portion of which would be appropriately formed to provide a guide for the winged portion of the stem of the valve 6. Other vertical borings are made in the billet to provide the apertures through the partition between the chambers 1 and 2 to be controlled by the main throttle valves 7, these bores being of appropriate diameter to receive valve seats 11. Axially aligned with the borings to be controlled by the valves 7 are other borings 12 in the partition between chambers 2 and 3, the balancing pistons 13 of the main throttle valves working in such borings 12. To give access to the throttle valves and initially to permit the boring of the apertures in the partitions between the chambers and the passage 9 the upper wall of the chamber 1 is first bored at appropriate places, these borings being marked 14, 15 in the drawings. The boring 14 is suitably larger in diameter than the boring 9 to permit the valve seat member 10 to be placed in position. The borings 15 similarly are of a diameter such as will permit the valve seat 11 to be placed in position. The apertures 14, 15 are closed by appropriate covers 16 secured by studs and nuts. A suitable necking 17 is welded or screwed and welded into an aperture bored through a vertical wall of the chamber 1 to the flange of which necking the fluid pressure inlet or supply pipe is connected. A similar flanged necking or neckings 18 is or are provided for the outlet of fluid pressure from chamber 2 through appropriate apertures bored in the vertical wall of the chamber. Conveniently these flanged neckings are formed of portions of steel tube on which wrought steel flanges are welded or screwed and welded.

Figure 3:
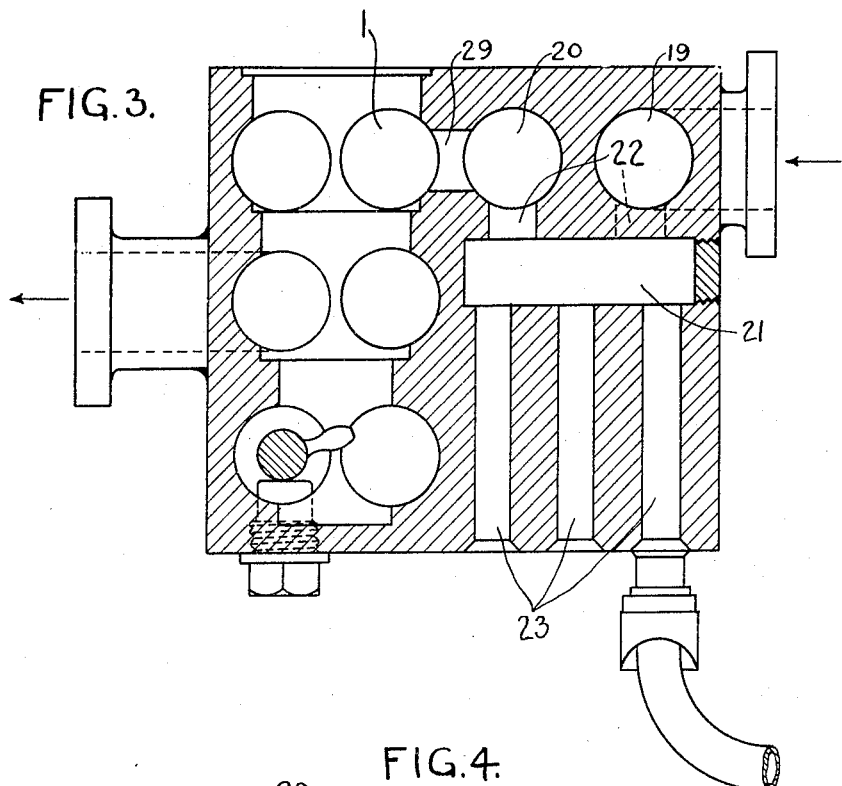
Fig. 3 illustrates in cross section an embodiment of the invention in which a combined steam superheater header and a valve housing for multiple valve regulating apparatus is formed from a solid billet as will be described.
Figure 4:
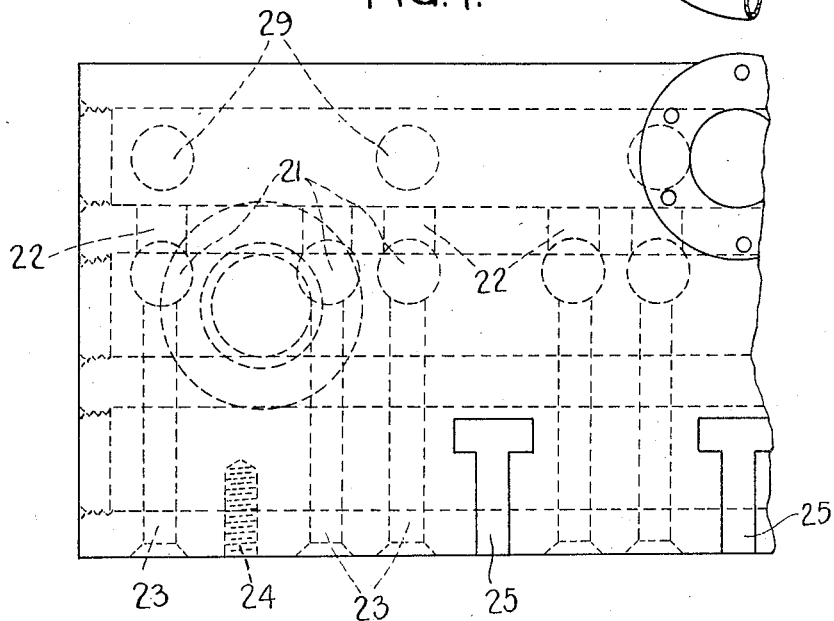
Fig. 4 is an elevation of the combined header and valve housing shown in Fig. 3 as seen from the right or smoke box tube plate side of the header.

Referring now to Figs. 3 and 4, in the embodiment of the invention therein shown a steam superheater header is combined with the regulator valve housing and is formed from a steel billet. The valve housing shown is of the form shown in Figs. 1 and 2 and the superheater header portion comprises longitudinal channels 19, 20 respectively for saturated and superheated steam, these channels being borings with their open ends closed by discs welded or screwed and welded into such ends. At appropriate intervals below the channels 19, 20 transverse pockets 21 are formed in the header by boring from the rear wall, the open ends being closed by discs similarly to the open ends of other borings already described. The pockets 21 are alternately saturated steam and superheated steam pockets, the saturated steam pockets being connected by vertical borings or machinings with the channel 19 and the superheated steam pockets similarly connected with the channel 20. The vertical borings or machinings by which the pockets are connected with the channels are marked 22. The ends of the superheater elements are connected to the pockets 21 by passages 23 bored upwardly from the bottom of the header, the upper ends of these passages breaking into the pockets 21 and the lower ends being suitably coned or otherwise formed to provide seats for the jointing surfaces on the ends of the elements. The elements may be secured to the header in any convenient manner; for example they may be connected by the known bridge bars or clamps engaging shoulders adjacent the pipe ends and a stud or bolt extending through the centre of the clamp or bridge bar. If studs be employed tapped holes such as 24 would be provided between the sets of vertical drillings 23 as shown at the left-hand portion of Fig. 4. Instead of screw studs, T-headed bolts may be employed for connecting the elements to the header in which case slots such as 25, Fig. 4, would be machined in the header, these slots extending between the sets of borings 23.

The header shown in Figs. 5, 6 and 7 is similar to that shown in Figs. 3 and 4 except that the longitudinal channels 19, 20 and the transverse pockets 21 are disposed in the lower portion of the billet and the majority of the metal above the channel 19 is cut away a portion of the metal being left at 26 in which passages 27, 28 are bored to provide communication between the saturated steam supply and the channel 19, a flanged necking being secured to the portion 26.

In Figs. 3 and 4 the superheated steam channel 20 is connected to the supply chamber 1 by transverse borings 29 at intervals in the length of the header. Similar borings 29 are provided in the construction shown in Figs. 5, 6, 7 and in addition vertical borings 30 are employed to connect the borings 29 with the channel 20, the upper ends of the boring 30 being closed by plugs screwed and welded into the header. The superheater elements may be connected to the header according to Figs. 5, 6, 7 in any convenient manner as described in connection with Figs. 3 and 4.

In the header according to the construction shown in Fig. 8 the transverse pockets 21 are omitted and the elements are connected to longitudinal channels 19ª, 20ª, which are arranged in the lower portion of the superheater header into which the short borings 23ª, break. The element ends would be secured to the header in pairs by clamp bars and studs and nuts, the clamp bars extending transversely in relation to the chambers 19a, 20a, the tapped holes 24a, for the studs being arranged between the drillings 23a.

It will be understood that where the regulating valves are not provided with balancing pistons the lower chamber of the housing would be omitted as also would be the passage connecting such chamber to the supply chamber and the pilot valve associated with such passage. In such a construction of valve apparatus the rock shaft for operating the valves can be located in the delivery chamber of the housing.

It will be seen that in Fig. 7 each chamber of the valve housing is formed of two borings disposed in the same horizontal plane of the billet, and having their axes so spaced that the peripheries of the borings intersect. It will be understood that three or more borings arranged in a plane may be employed if desired, their axes being spaced so that the peripheries of adjacent borings intersect.

Instead of employing passages formed by boring to connect the superheated steam channel or chamber of the superheater header to the supply chamber of the valve housing, a series of slots might be machined through the metal of the billet obtaining between the supply chamber and the superheated steam channel of the header.

The illustrations in the drawings and particularly described herein are given by way of example and various modifications may be made without departing from the invention; for instance, instead of employing a single transverse boring 21 for each transverse row of borings 23, two rows of borings 23 might be arranged to break into a relatively large transverse boring 21, except at the ends of the header where only a single row of borings 23 would be connected to the transverse boring 21. It will be understood that the blind ends of the borings 21, which form the transverse pockets of the superheater header, are in vertical alignment, or approximately so, with the front side or wall of the boring forming the superheated steam channel or chamber of the header.

Instead of forming the superheater header integrally with the valve housing the header may be formed separately therefrom and suitably secured thereto. For example, a header formed of wrought steel, either by boring from a solid billet or by an assembly of wrought steel components welded or otherwise appropriately secured together, may have its delivery or outlet necking or neckings welded to the valve housing at an opening or openings formed in one vertical side thereof and leading into the supply chamber of the housing.

Other modifications might be made without departing from the invention, the essential feature of which is the provision of a homogeneous wrought steel structure constituting a valve housing which can be simply constructed and be of less size and weight proportionate to the capacity and strength required than heretofore, and which will be capable of use for far greater pressures and temperatures than heretofore without increase of weight or size.

I claim:

1. The combination of a multiple throttle housing comprising a generally rectangular prismatic block of metal having three pairs of parallel, vertically spaced, cylindrical, longitudinal bores and having a plurality of vertical bores distributed longitudinally along the block and each intersecting the three pairs of longitudinal bores, the middle pair of bores terminating short of one end of the block, there being a further vertical bore through the metal between the end of the middle pair and the end of the block and intersecting the upper and lower pair of bores; there being a further pair of longitudinal bores in the block, as well as passages connecting one of said further bores with the top pair of said first-named bores and the other of said further bores to a source of saturated steam passages being provided from each of said further bores to a face of the block for superheater element connections, and valves in said vertical bores adapted to control the flow of steam from the upper pair of said longitudinal bores to the middle pair of said longitudinal bores, said valves having balancing pistons in the portions of said vertical bores extending between the middle pair of said longitudinal bores and the lower pair of said longitudinal bores, and an additional valve in one of said vertical bores adapted to control the flow of steam from the upper pair of said longitudinal bores to the lower pair thereof.

2. The combination of a solid block header and housing having a longitudinal bore and an inlet passage connecting therewith from above, a bore parallel to said bore, passages from each of said bores to the lower face of the block for superheater element connections, horizontal, longitudinal and vertical transverse bores arranged to form an upper steam chamber, a lower balancing chamber and a central outlet chamber, and connected passages arranged at right angles and extending from said second mentioned bore to said steam chamber, and valves in said vertical transverse bores for controlling the flow of steam to said outlet chamber from said steam chamber.

REGINALD W. WHITTLE.